W. J. N. DAVIS.
MEANS FOR LOCKING AUTOMOBILE STARTING CRANKS.
APPLICATION FILED OCT. 14, 1910.

1,037,601.

Patented Sept. 3, 1912.

Witnesses:

Inventor:
William J. N. Davis,
By Dyrenforth, Lee, Chritton & Wiles,
Per W. N. Dyrenforth, Atty's.

UNITED STATES PATENT OFFICE.

WILLIAM J. N. DAVIS, OF CHICAGO, ILLINOIS.

MEANS FOR LOCKING AUTOMOBILE STARTING-CRANKS.

1,037,601.  Specification of Letters Patent.  Patented Sept. 3, 1912.

Application filed October 14, 1910. Serial No. 587,007.

*To all whom it may concern:*

Be it known that I, WILLIAM J. N. DAVIS, a citizen of the United States, residing at Chicago, in the county of Cook and State of Illinois, have invented a new and useful Improvement in Means for Locking Automobile Starting-Cranks, of which the following is a specification.

The object of my invention is to provide simple and effective means for preventing the theft of automobiles by locking their starting-cranks.

My invention is designed for use with the starting crank which is inseparably secured in place on an automobile and is normally spring-held out of engagement with the shaft, requiring the crank-stem to be forced inwardly to engage it therewith preparatory to "cranking."

Figure 1:
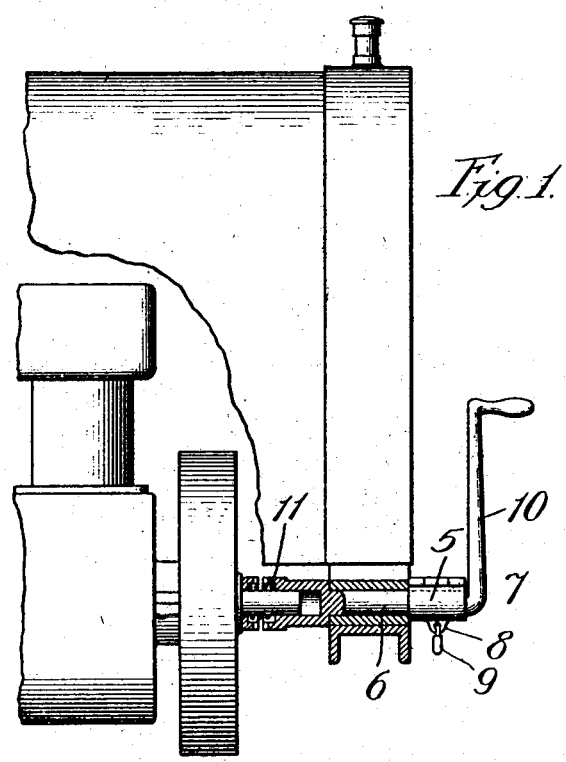
Figure 2:
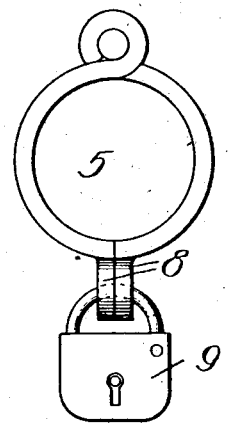
Figure 3:
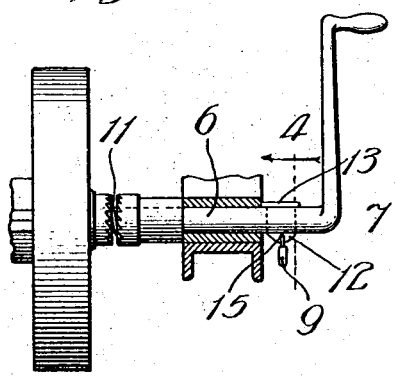

In the accompanying drawings—Figure 1 is a broken view in elevation, partly sectional, showing a starting-crank in place on an automobile and provided with my improvement in one form of embodiment; Fig. 2 is an enlarged view in elevation of my device shown in Fig. 1; Fig. 3 is a view showing the starting-crank as in Fig. 1 but provided with a modified form of my locking device; and Fig. 4 is an enlarged section on line 1, Fig. 3.

One form of my locking device, shown in Figs. 1 and 2, comprises a collar 5 formed of two sections hinged together to fit about the normally-protruding part of the stem 6 of an automobile starting-crank 7, and it is provided on its free edges with perforated ears 8 through which to pass the hasp of a padlock for locking the collar in its operative position about that part of the crank, where its confinement between the crank-arm 10 and crank-stem receiving socket in the automobile causes it to act as a stop against moving the stem inwardly against the resistance of the outwardly-throwing spring 11 to clutch it with the starting-shaft of the automobile.

Figure 4:
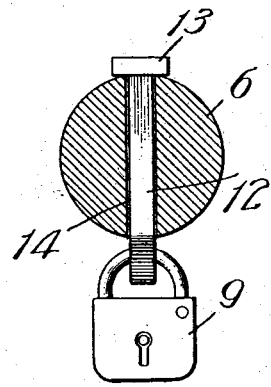

Another form of embodiment of my invention, shown in Figs. 3 and 4, consists of a pin 12, preferably of the flat and wide form shown, having a head 13 and insertible through a longitudinal slot 14 provided in the protruding part of the crank-stem 6, and provided with a hole 15 in its headless protruding end to receive the padlock-hasp for locking the pin against withdrawal. In the case the pin also affords a stop to prevent the inward movement of the starting-crank for the cranking purpose.

What I claim as new and desire to secure by Letters Patent is—

1. A locking device of the class described, comprising a sleeve designed to be removably fitted to a cranking-shaft and to extend between the crank thereon and the support through which the shaft is mounted and constituting an abutment for preventing longitudinal movement of the shaft.

2. A locking device of the class described, comprising an abutment consisting of hinged sections, the device being adapted for application to a cranking shaft with the sections thereof embracing the shaft and extending between the crank thereon and the support through which the shaft is mounted, and means for holding the sections of the sleeve assembled about the shaft.

3. In a locking device of the class described, a two-part sleeve adapted to be removably fitted upon a cranking-shaft and to extend between the crank of the shaft and the support through which the shaft is mounted and to serve as an abutment for holding the shaft against longitudinal movement, and means holding the parts of the sleeve assembled.

4. A device of the class described, comprising a sleeve consisting of hinged sections provided with apertured ears at their free edges, the sleeve being adapted for disposal about a cranking-shaft and to extend between the crank thereon and the support through which the shaft is mounted and to constitute means for preventing longitudinal movement of the shaft, and a lock having a hasp engaged through the apertures in the said ears.

5. In combination with the starting-crank of an automobile, having its stem normally held yieldingly out of engagement with the starting-shaft, a stop on the normally-protruding portion of the crank-stem between the crank-handle and stem-receiving socket, to obstruct inward movement of the stem, the stop being readily removable bodily from the crank-stem, and a lock for temporarily securing the stop against removal, for the purpose set forth.

6. In combination with the starting-crank of an automobile, having its stem normally held yieldingly out of engagement with the starting-shaft, a collar about the normally protruding portion of the crank-stem between the crank-handle and stem-receiving socket to obstruct inward movement of the stem, said collar being formed of separable sections adapting it to be readily applied to and removed from the crank-stem, and a lock for temporarily securing the collar-sections together about the stem, for the purpose set forth.

7. In combination with the starting-crank of an automobile, having its stem normally spring-held out of engagement with the starting-shaft, a collar comprising hinged sections fitting about the normally-protruding portion of the crank-stem between the crank-handle and stem-receiving socket, perforated ears on the free ends of the collar, and a lock engaging said ears, for the purpose set forth.

WILLIAM J. N. DAVIS.

In presence of—
R. A. SCHAEFER,
JOHN WILSON.

Copies of this patent may be obtained for five cents each, by addressing the "Commissioner of Patents, Washington, D. C."